April 7, 1936.  L. F. HAVENS  2,036,331
STORAGE BATTERY CAP
Filed Aug. 13, 1935

Inventor
Lloyd F. Havens

By Clarence A. O'Brien
Attorney

Patented Apr. 7, 1936

2,036,331

UNITED STATES PATENT OFFICE 2,036,331

STORAGE BATTERY CAP

Lloyd F. Havens, Iowa Falls, Iowa

Application August 13, 1935, Serial No. 36,000

1 Claim. (Cl. 136—177)

This invention relates to improvements in caps or plugs for storage battery, the general object of the invention being to provide the plugs or caps with a window so that the level of liquid in the battery cells can be ascertained without removing the plugs or caps.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
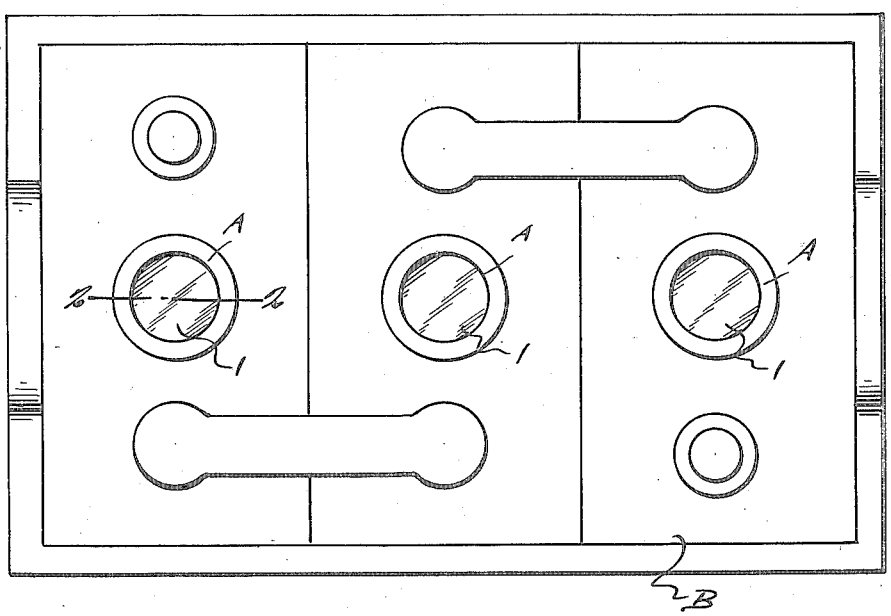
Figure 1 is a top plan view of a battery the plugs or caps of which are constructed in accordance with this invention.
Figure 2:
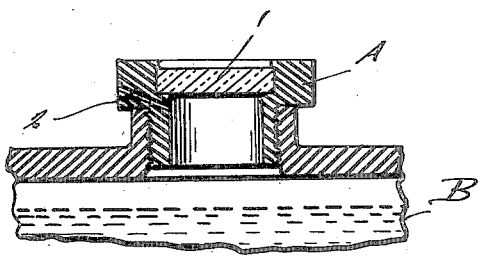
Figure 2 is a section on the line 2—2 of Figure 1.

In these views the battery is shown at B and the plug or cap at A. These plugs are threaded in openings in the cells of the battery in the usual manner and each plug is of tubular construction with the upper or outer end of the bore enlarged to receive a disk I of shatter-proof glass the upper face of which is below the top of the cap as shown in Figure 2. The disk is held in place in any suitable manner and as it will be seen from Figure 2 rests upon a shoulder formed in the cap. The cap is provided with a sloping vent hole 2. Thus it will be seen that by looking through the glass I the level of liquid in the cell can be ascertained without removing the plugs or caps so that much time and labor are saved by this invention.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

Means for permitting the liquid level of a storage battery cell to be seen without the removal of the cell cap, comprising a cap having a reduced exteriorly threaded lower part for threading in a cell opening, said cap having a bore passing from one end thereof through the other end, that part of the bore passing through the outer end of the cap being of greater diameter than the rest of the bore and the junction of the two parts of the bore forming a shoulder and a disk of transparent material located in the large part of the bore and resting on the shoulder, said disk having flat, upper and lower faces with its upper face located slightly below the upper end of the cap, and portions of the material of the cap being pressed over the margin of the upper face of the disk to hold the disk in place, and said cap having a vent opening therein passing from that part of the bore immediately under the disk through a side portion of the head of the cap.

LLOYD F. HAVENS.